US012644572B2

(12) United States Patent
Miwa et al.

(10) Patent No.: US 12,644,572 B2
(45) Date of Patent: Jun. 2, 2026

(54) VEHICLE LAMP AND METHOD OF CONTROLLING VEHICLE LAMP CONFIGURED TO SWITCH BETWEEN A NORMAL LIGHT DISTRIBUTION AND ROAD SURFACE DRAWING

(71) Applicant: Koito Manufacturing Co., Ltd., Tokyo (JP)

(72) Inventors: Mariko Miwa, Shizuoka (JP); Saki Nakamura, Shizuoka (JP); Qiwei Ye, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/999,780

(22) Filed: Dec. 23, 2024

(65) Prior Publication Data

US 2025/0122987 A1 Apr. 17, 2025

Related U.S. Application Data

(63) Continuation of application No. PCT/JP2023/024575, filed on Jul. 3, 2023.

(30) Foreign Application Priority Data

Jul. 6, 2022 (JP) ................................ 2022-109210

(51) Int. Cl.
*F21S 41/63* (2018.01)
*F21S 41/143* (2018.01)
*F21S 41/64* (2018.01)

(52) U.S. Cl.
CPC .......... *F21S 41/635* (2018.01); *F21S 41/143* (2018.01); *F21S 41/645* (2018.01)

(58) Field of Classification Search
CPC ...... F21S 41/645; F21S 41/153; F21S 41/657; F21S 41/663; F21W 2103/60
See application file for complete search history.

(56) References Cited

U.S. PATENT DOCUMENTS 10,336,242 B2 * 7/2019 Canonne ............. B60Q 1/0076
10,775,011 B2 * 9/2020 Kamiya ................ F21S 43/249
(Continued)

FOREIGN PATENT DOCUMENTS

JP 2004-136838 A 5/2004
JP 2008-296660 A 12/2008
(Continued)

OTHER PUBLICATIONS

Mach Tranlsation of JP2020131922A (Year: 2020).*
(Continued)

*Primary Examiner* — Robert J May
(74) *Attorney, Agent, or Firm* — BUCHANAN, INGERSOLL & ROONEY PC

(57) ABSTRACT

A vehicle lamp includes an optical unit including a spatial light modulator that provides a normal light distribution pattern and a road surface drawing, and an actuator that drives the optical unit so as to switch an illumination direction of the optical unit between a first direction for the normal light distribution pattern and a second direction for the road surface drawing, the second direction pointing more downward than the first direction. The spatial light modulator is configured to turn on at least part of an off area of the spatial light modulator for the normal light distribution pattern along with an on area of the spatial light modulator for the normal light distribution pattern, during a restoration operation of the actuator that drives the optical unit so as to restore the illumination direction of the optical unit upward from the second direction to the first direction.

6 Claims, 6 Drawing Sheets

(56) References Cited

U.S. PATENT DOCUMENTS

| | | | |
|---|---|---|---|
| 2008/0298077 | A1 | 12/2008 | Naganawa et al. |
| 2022/0001790 | A1 | 1/2022 | Mochizuki et al. |

FOREIGN PATENT DOCUMENTS

| | | | | | |
|---|---|---|---|---|---|
| JP | 2009-248951 | A | | 10/2009 | |
| JP | 2020131922 | A | * | 8/2020 | ........... B60Q 1/1423 |
| WO | 2020/066599 | A1 | | 4/2020 | |

OTHER PUBLICATIONS

International Search Report (Form PCT/ISA/210) issued on Sep. 5, 2023, by the Japanese Patent Office in corresponding International Application No. PCT/JP2023/024575. (5 pages).

* cited by examiner

VEHICLE LAMP AND METHOD OF CONTROLLING VEHICLE LAMP CONFIGURED TO SWITCH BETWEEN A NORMAL LIGHT DISTRIBUTION AND ROAD SURFACE DRAWING

CROSS-REFERENCE TO RELATED APPLICATIONS

This application is the continuation of International Patent Application No. PCT/JP2023/024575, filed on Jul. 3, 2023, which claims the benefit of priority from Japanese Patent Application No. 2022-109210, filed on Jul. 6, 2022, the entire content of each of which is incorporated herein by reference.

BACKGROUND

Technical Field

The present disclosure relates, for example, to vehicle lamps that can be installed in vehicles, such as automobiles, and to methods of controlling such vehicle lamps.

Description Of Related Art

There are known to date vehicle headlamps provided with a figure drawing optical unit separate from a low beam optical unit (see, for example, Patent Literature 1). With the use of a figure drawing optical unit, such a vehicle headlamp can draw, on a road surface, a variety of patterns, including desired letters, figures, and symbols, and can present various pieces of information to the driver and occupants of the host vehicle, to pedestrians around the host vehicle, or to other surrounding vehicles.

SUMMARY

Having studied such vehicle lamps as described above, the present inventor has come to recognize the following shortcomings. When a low beam optical unit and a figure drawing optical unit are integrated into a unit, this can simplify the configuration of the vehicle lamp, which in turn can provide advantages in size and cost reduction. It may generally be desired that a road surface drawing and a light distribution for, for example, a low beam, from a headlamp be projected at different distances from the vehicle. When, for example, a message welcoming the driver getting into the vehicle is to be displayed on the ground near the vehicle, the message may often be drawn on the road surface relatively close to the vehicle; whereas the headlamp light distribution may be projected afar to improve the forward visibility or to meet the statutory requirements. Accordingly, with the integrated optical unit mentioned above, it is advantageous to, with the use of a driving source, such as a leveling actuator, make the optical axis adjustable in accordance with a light distribution pattern to be projected. In other words, when configured to have its optical axis lowered for a road surface drawing than for a headlamp light distribution, the integrated optical unit can easily be adapted for use both for road surface drawing and as a headlamp.

Now, a situation in which the vehicle starts moving in the middle of road surface drawing will be considered. In order to ensure the forward visibility, the integrated optical unit should immediately pause the road surface drawing and switch to a headlamp light distribution. At this point, since the optical axis of the optical unit has been lowered for the road surface drawing, in order for the optical unit to illuminate a prescribed far position as a headlamp, the actuator may need to be driven to move back the optical axis. Although this restoration operation takes only as slight as, for example, a few seconds, it still requires a certain amount of time. If the restoration operation does not complete before the vehicle starts moving, this may create a situation in which a far position that is supposed to be illuminated fails to be sufficiently illuminated for the period from when the vehicle starts moving to when the restoration operation completes.

Such a concern regarding the forward visibility may rise not only in restoration from a road surface drawing but also in restoration from other operations involving making an adjustment or change to the illumination direction of the optical unit, including the initializing operation of the actuator, for example.

The present disclosure has been made in view of such circumstances, and one of the illustrative objects of an aspect thereof is to provide a vehicle lamp that helps to ensure the forward visibility during a restoration operation of restoring the illumination direction of an optical unit, and a method of controlling such a vehicle lamp.

To address the problem above, a vehicle lamp according to one aspect of the present disclosure includes an optical unit including a spatial light modulator that provides a normal light distribution pattern and a road surface drawing, and an actuator that drives the optical unit so as to switch an illumination direction of the optical unit between a first direction for the normal light distribution pattern and a second direction for the road surface drawing, the second direction pointing more downward than the first direction. The spatial light modulator is configured to turn on at least part of an off area of the spatial light modulator for the normal light distribution pattern along with an on area of the spatial light modulator for the normal light distribution pattern, during a restoration operation of the actuator that drives the optical unit so as to restore the illumination direction of the optical unit upward from the second direction to the first direction.

According to this aspect, during the restoration operation, not only the on area of the spatial light modulator for the normal light distribution pattern but also at least part of the off area of the spatial light modulator for the normal light distribution pattern is turned on. As compared to the case in which only the on area of the spatial light modulator for the normal light distribution pattern is turned on, the aspect above can illuminate more broadly ahead of the vehicle. This configuration can thus improve the visibility ahead of the vehicle.

A region illuminated by the at least part of the off area turned on during the restoration operation may be located above a region illuminated by the on area for the normal light distribution pattern. With this configuration, as compared to the case in which only the on area of the spatial light modulator for the normal light distribution pattern is turned on, this configuration can illuminate even farther. This configuration can thus improve the visibility ahead of the vehicle.

An upper edge of the region illuminated by the at least part of the off area turned on during the restoration operation may form a cutoff line of the normal light distribution pattern at least temporarily during the restoration operation. With this configuration, the cutoff line of the normal light distribution pattern can be formed during the restoration operation with the use of the off area of the spatial light modulator for the normal light distribution pattern.

The at least part of the off area turned on during the restoration operation may be reduced in size in synchronization with the restoration operation such that the cutoff line is retained during the restoration operation. With this configuration, the cutoff line of the normal light distribution pattern can be retained at its set position during the restoration operation.

Another aspect of the present disclosure provides a method of controlling a vehicle lamp. The vehicle lamp includes an optical unit that includes a spatial light modulator, and an actuator capable of adjusting an illumination direction of the optical unit. The method includes operating the spatial light modulator so as to provide a normal light distribution pattern in a state in which the illumination direction of the optical unit is pointed in a first direction, operating the spatial light modulator so as to provide a road surface drawing in a state in which the illumination direction of the optical unit is pointed in a second direction pointing more downward than the first direction, and turning on at least part of an off area of the spatial light modulator for the normal light distribution pattern along with an on area of the spatial light modulator for the normal light distribution pattern during a restoration operation of the actuator, the restoration operation restoring the illumination direction of the optical unit upward from the second direction to the first direction.

Yet another aspect of the present disclosure provides a vehicle lamp. This vehicle lamp includes an optical unit including a spatial light modulator that provides a normal light distribution pattern, and an actuator that drives the optical unit so as to switch an illumination direction of the optical unit between a first direction for the normal light distribution pattern and a second direction different from the first direction. The spatial light modulator is configured to turn on at least part of an off area of the spatial light modulator for the normal light distribution pattern along with an on area of the spatial light modulator for the normal light distribution pattern, during a restoration operation of the actuator that drives the optical unit so as to restore the illumination direction of the optical unit from the second direction to the first direction.

DETAILED DESCRIPTION

Figure 1:
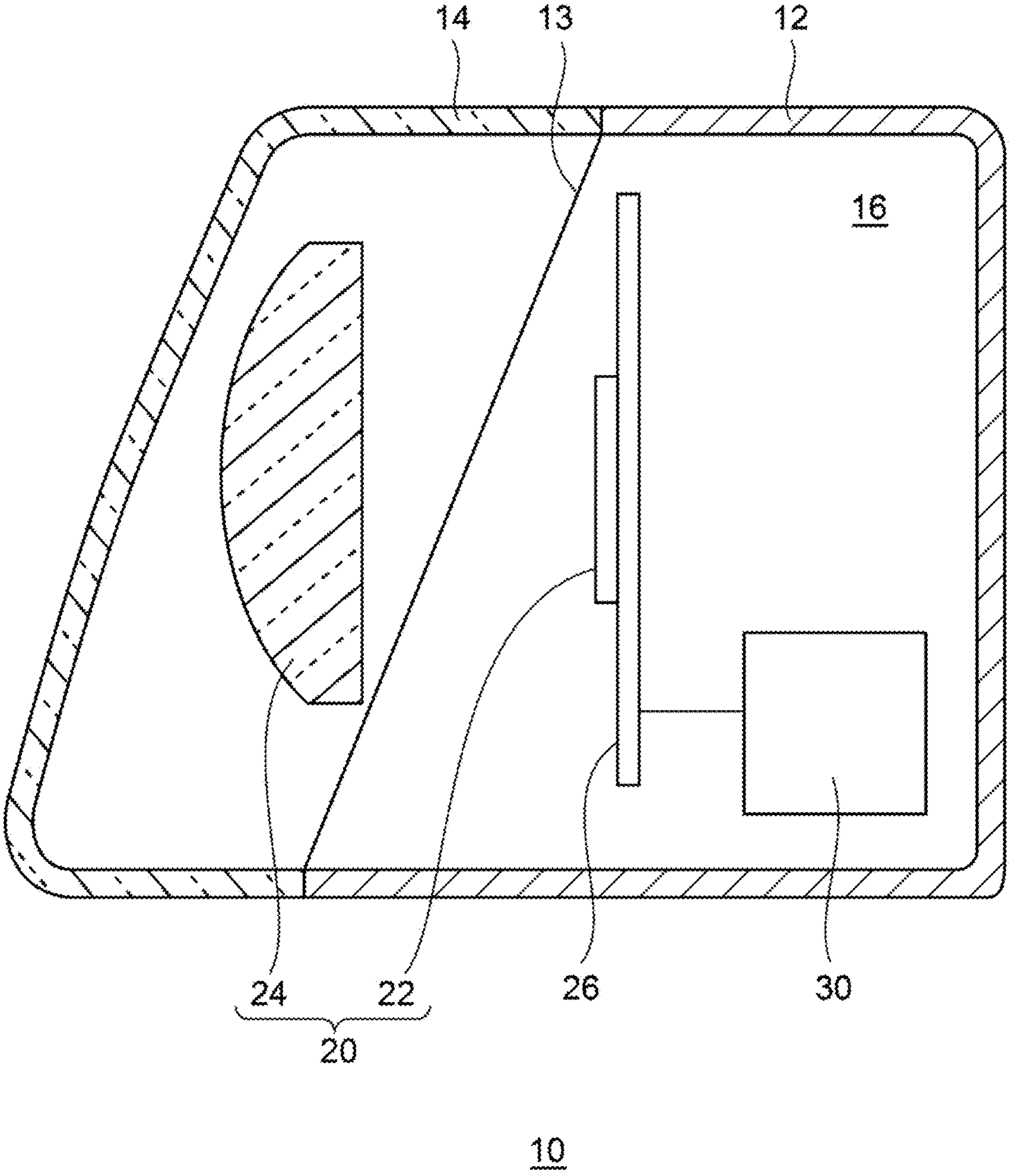
FIG. 1 shows a schematic configuration of a vehicle lamp according to an embodiment.

The invention will now be described by reference to the preferred embodiments. This does not intend to limit the scope of the present invention, but to exemplify the invention.

Hereinafter, the present disclosure will be described based on some exemplary embodiments and with reference to the drawings. The embodiments are illustrative in nature and are not intended to limit the invention. Not all the features and combinations thereof described in the embodiments are necessarily essential to the invention. Identical or equivalent constituent elements, members, and processes illustrated in the drawings are given identical reference characters, and their duplicate description will be omitted as appropriate. The scales and shapes of the components illustrated in the drawings are set merely for convenience to facilitate the description and are not to be interpreted as limiting, unless specifically indicated otherwise. Terms such as "first" and "second" used in the present specification and in the claims do not in any way indicate the order or importance and are merely for distinguishing a given configuration from another configuration. In the drawings, part of members that are not important in describing the embodiments is omitted.

FIG. 1 shows a schematic configuration of a vehicle lamp according to an embodiment. A vehicle lamp 10 is a vehicle headlamp apparatus that includes a pair of headlamp units to be provided at the front right and left of a vehicle. The pair of headlamp units have roughly horizontally symmetrical structures and have substantially the same configuration. FIG. 1 shows one of the headlamp units.

The vehicle lamp 10 includes a lamp body 12 having a front opening 13, and a light transmissive cover 14 attached to the lamp body 12 so as to cover the front opening 13. Typically, the lamp body 12 is formed of an appropriate material such as a general-purpose resin material, and the light transmissive cover 14 is formed of an appropriate light transmissive material such as a synthetic resin material or glass having a light transmissive property.

The lamp body 12 and the light transmissive cover 14 form a housing of the vehicle lamp 10. The vehicle lamp 10 includes an optical unit 20 and an actuator 30 provided in a lamp room 16, the inner space of the lamp's housing. The optical unit 20 includes a spatial light modulator 22 and a projection optical system 24.

The spatial light modulator 22 includes a large number of pixels 23 arranged two-dimensionally (see FIG. 3), and the pixels 23 can be controlled independently of each other. The spatial light modulator 22 can generate a variety of light distribution patterns by controlling (e.g., switching on/off) these pixels 23 independently of each other.

In this embodiment, the spatial light modulator 22 may be a device in which a large number of light emitting elements (e.g., LEDs) are arranged in a matrix. In this case, each of the light emitting elements functions as a pixel 23. Such a high-definition device may also be referred to, for example, as a pixel light or a matrix LED. In place of this spatial light modulator 22 of self-emission type, a spatial light modulator of other types may be used, such as a combination of a light source and a micro-electromechanical system (MEMS) device, like a micromirror device, or a liquid crystal display.

The spatial light modulator 22 provides a normal light distribution pattern and a road surface drawing. A normal light distribution pattern is a light distribution pattern for forward visibility, and examples may include a low beam light distribution pattern having a cutoff line or a high beam light distribution pattern. Meanwhile, a light distribution pattern for a road surface drawing may include a variety of patterns to be drawn on a road surface, including desired letters, figures, and symbols. A road surface drawing can present various pieces of information, for example, by displaying a message welcoming the driver getting into the vehicle on the ground near the vehicle or by calling attention of, for example, the driver of the host vehicle, pedestrians around the host vehicle, or the drivers of other vehicles.

Herein, so-called adaptive driving beam (ADB) control of dynamically and adaptively controlling a high beam light distribution pattern based on the situations surrounding the vehicle may be applied to the spatial light modulator 22. As known, with ADB control, glare that may be caused to a front vehicle can be reduced or prevented by detecting a front vehicle, such as a leading vehicle or an oncoming vehicle, located ahead of the host vehicle and by forming a dimmed region corresponding to the front vehicle within a high beam light distribution pattern.

The projection optical system 24 is configured to project a light distribution pattern generated by the spatial light modulator 22 to the outside of the vehicle lamp 10. The projection optical system 24 includes at least one optical member (e.g., a lens or a reflector). Typically, as shown in FIG. 1, the projection optical system 24 may include a projection lens that receives light from the spatial light modulator 22 and projects the received light to the outside of the vehicle lamp 10 through the light transmissive cover 14. Herein, the projection optical system 24 may be an inverting optical system that projects an inverted image of a light distribution pattern formed on the spatial light modulator 22.

The optical unit 20 may include a support 26 that supports the spatial light modulator 22, and the support 26 may function as a heat dissipating member for dissipating heat generated by the spatial light modulator 22. The projection optical system 24 may be attached to the support 26 by an attachment member (not shown).

The actuator 30 is a so-called leveling actuator that drives the optical unit 20 so as to change the attitude of the optical unit 20 in the up-down direction. In the lamp room 16, the actuator 30 is disposed closer to the lamp body 12 than is the optical unit 20 (e.g., below or behind the optical unit 20). The driving shaft of the actuator 30 is coupled, for example, to the support 26 of the optical unit 20, and this configuration enables the actuator 30 to drive the optical unit 20.

The optical unit 20 (e.g., the support 26) is supported on the lamp body 12 so as to be tiltable relative to the lamp body 12. The optical axis of the optical unit 20 (the projection optical system 24) can be adjusted as the actuator 30 is operated to change the attitude (the angle) of the optical unit 20 relative to the lamp body 12. With this configuration, the vehicle lamp 10 can set the illumination direction of the optical unit 20, that is, the direction of light that the vehicle lamp 10 emits to the outside to a desired direction. Various known configurations can be adopted as appropriate for the support structure of the actuator 30 and the optical unit 20, and detailed description of such are omitted herein.

Figure 2:
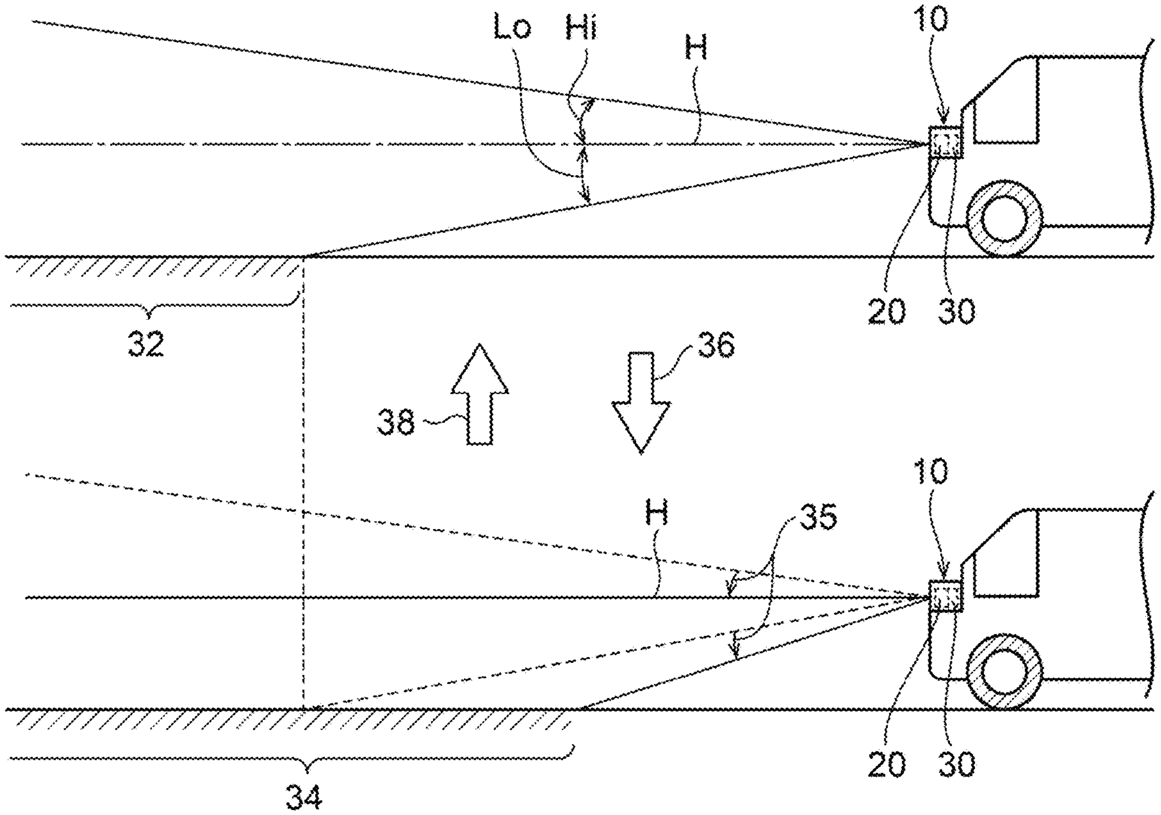
FIG. 2 is a schematic diagram showing an illustrative operation of the vehicle lamp shown in FIG. 1.

FIG. 2 is a schematic diagram showing an illustrative operation of the vehicle lamp 10 shown in FIG. 1. In this embodiment, the actuator 30 drives the optical unit 20 so as to set the illumination direction of the optical unit 20 to a desired direction according to a light distribution pattern that the spatial light modulator 22 generates. To be more specific, the actuator 30 drives the optical unit 20 so as to switch the illumination direction of the optical unit 20 between a first direction for a normal light distribution pattern and a second direction for a road surface drawing.

This embodiment allows for achieving both a normal light distribution and a road surface drawing with the single optical unit 20. Accordingly, the structure can be simplified as compared to a conventional, typical vehicle lamp that employs separate optical units for a normal light distribution and a road surface drawing, and this in turn allows for size and cost reduction of the vehicle lamp 10.

The upper half of FIG. 2 shows the case of a normal light distribution. The illumination direction of the optical unit 20 is in the first direction. The cutoff line of the low beam light distribution lies in or near a horizontal plane H (e.g., somewhat below the horizontal plane H), a low beam Lo illuminates the space below the cutoff line, and a high beam Hi illuminates the space above. When the illumination direction of the optical unit 20 is in the first direction, as shown in FIG. 2, the light distribution pattern illuminates a relatively far position, that is, a first portion 32 of the road surface ahead of and away from the vehicle.

Figure 3:
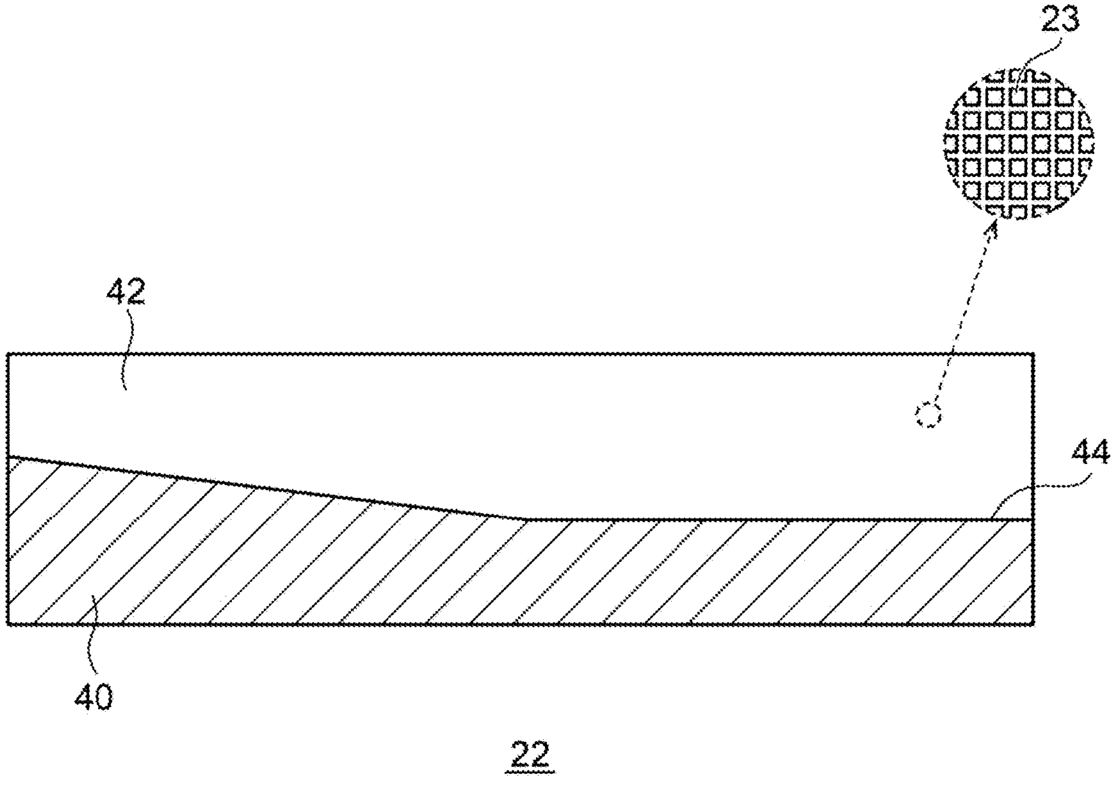
FIG. 3 is a schematic diagram showing an illustrative operation of the spatial light modulator shown in FIG. 1.

FIG. 3 is a schematic diagram showing an illustrative operation of the spatial light modulator 22 shown in FIG. 1. FIG. 3 illustrates an on area 40 and an off area 42 of the spatial light modulator 22 in a low beam light distribution. The on area 40 is formed by the pixels 23 that are on in the spatial light modulator 22, and the off area 42 is formed by the pixels 23 that are off in the spatial light modulator 22. The low beam light distribution is formed by the on area 40, and a border 44 between the on area 40 and the off area 42 forms the cutoff line. A high beam light distribution can be formed when at least part of the off area 42 (e.g., a portion adjacent to the on area 40) or the entire off area 42 is turned on.

In the example shown in FIG. 3, the on area 40 is located below the off area 42 in the spatial light modulator 22, in accordance with the positional relationship between the low beam Lo and the high beam Hi in FIG. 2. However, when the projection optical system 24 is an inverting optical system as mentioned above, the on area 40 may, invertedly, be located above the off area 42 in the spatial light modulator 22.

Herein, in the case of a spatial light modulator 22 of reflective type, such as a micromirror device, a pixel 23 being “on” corresponds to a state in which the pixel 23 reflects light from a light source toward the projection optical system 24, and a pixel 23 being “off” corresponds to a state in which the pixel 23 reflects light from a light source so as not to hit the projection optical system 24.

Referring back to FIG. 2, the lower half of FIG. 2 shows the case of a road surface drawing. The illumination direction of the optical unit 20 is in the second direction. The second direction points more downward than the first direction. The downward angle change (arrows 35) to the second direction from the first direction may be set such that, for example, the upper edge of the high beam Hi in the first direction is moved to or near the horizontal plane H.

For an easier understanding, the bundle of rays traveling when the illumination direction of the optical unit 20 is in the first direction is indicated by the dashed lines. Bringing the illumination direction of the optical unit 20 downward from that for a normal light distribution allows the road surface drawing pattern to illuminate a second portion 34 of the road surface closer to the vehicle than is the first portion 32.

When the normal light distribution is switched to the road surface drawing, the actuator 30 drives the optical unit 20 so as to shift the illumination direction of the optical unit 20 downward from the first direction to the second direction (indicated by a downward arrow 36 in FIG. 2, for convenience). Meanwhile, when the road surface drawing is switched to the normal light distribution, the actuator 30 drives the optical unit 20 so as to restore the illumination direction of the optical unit 20 upward from the second direction to the first direction (indicated by an upward arrow 38). This operation may be referred to below as a “restoration operation.”

A restoration operation is performed when ending road surface drawing. For example, a restoration operation is performed when a road surface drawing completes, to prepare for a subsequent surface normal light distribution. Alternatively, a restoration operation may be performed when a road surface drawing is paused to switch to a normal light distribution.

A road surface drawing may be paused, for example, when the vehicle starts moving in the middle of a road surface drawing or when the vehicle may start moving. An event that can trigger a pause in a road surface drawing is, for example, emergence of a vehicle speed (e.g., an increase from the zero vehicle speed to a certain positive value). This can be considered a representative example of events directly indicating that the vehicle has started moving. Another event that can trigger a pause in a road surface drawing is, for example, a shift operation to the D range. This can be considered a representative example of events indicating that the vehicle may soon start moving.

Various examples of events that can trigger a pause in a road surface drawing may include an event indicating that the driver has gotten into the vehicle (e.g., the vehicle's door sensor detecting the door closing, the seat sensor detecting the driver having sat in the seat, etc.), an event indicating that the driver in the vehicle performs an operation (releasing the parking brake or the emergency brake, turning on the power switch in an electric vehicle, turning on the engine switch in a gasoline-fueled vehicle, turning off the vehicle's interior light, turning on the air conditioner, etc.), and making a remotely controlled request from an external mobile device, such as a smartphone or a remote control. In the case of a self-driving vehicle, a remotely controlled request from the outside, such as a management center, is also an example of such events.

Figure 4:
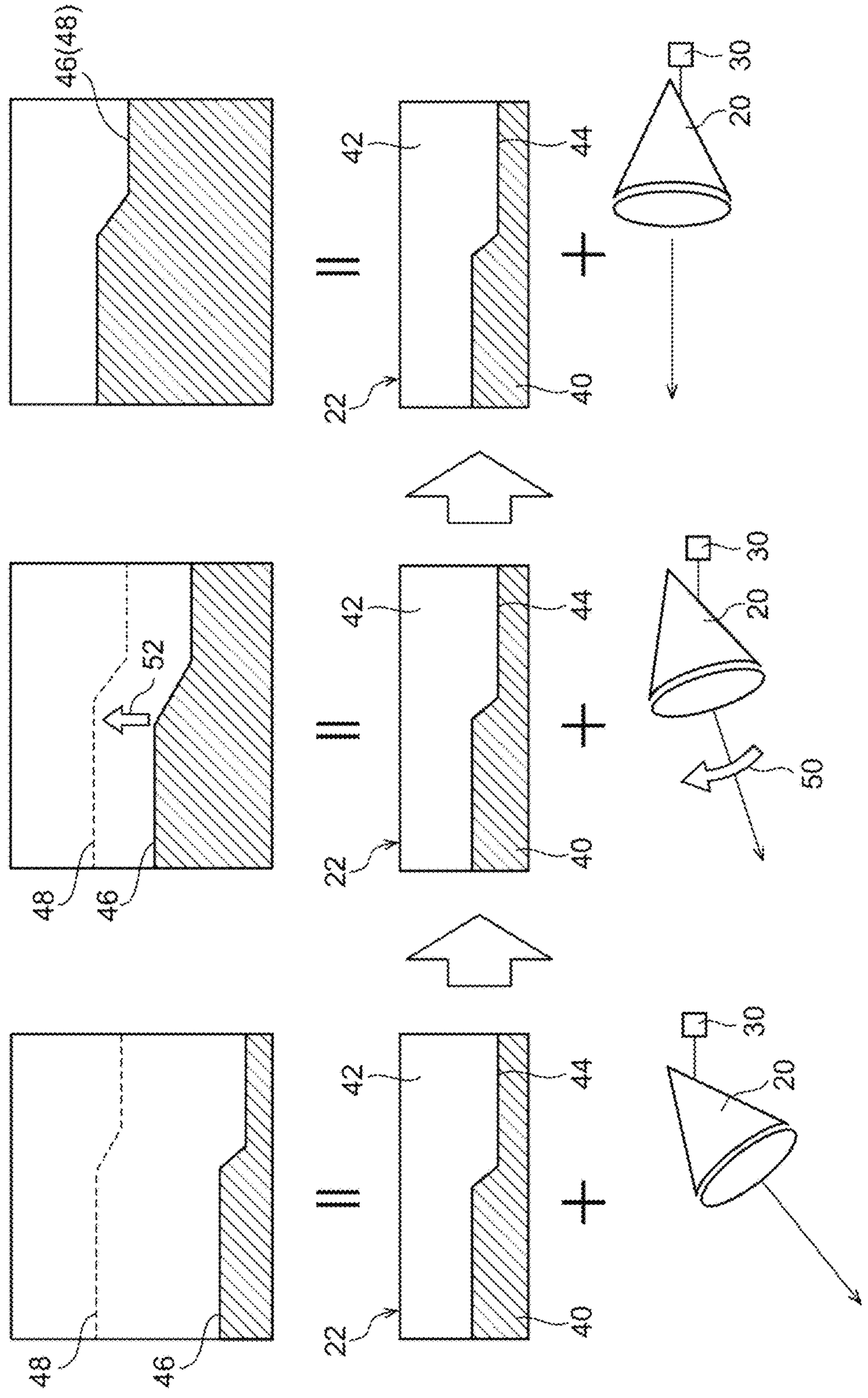
FIG. 4 is a schematic diagram showing a restoration operation of a vehicle lamp according to a comparative example.

FIG. 4 is a schematic diagram showing a restoration operation of a vehicle lamp according to a comparative example. In FIG. 4, the top row shows an image of a light distribution ahead of the vehicle as viewed from the driver, the middle row shows an on area 40 and an off area 42 of a spatial light modulator 22, and the bottom row shows the illumination direction of an optical unit 20 schematically by the arrow.

First, the left column of FIG. 4 shows the state held at the start of the restoration operation. Simultaneously as a road surface drawing is paused, an on area 40 and an off area 42, like those shown in FIG. 3, are set in the spatial light modulator 22, and a low beam light distribution serving as a normal light distribution pattern is generated. At this moment, the illumination direction of the optical unit 20 is still in the second direction for the road surface drawing. Therefore, the cutoff line 46 projected ahead of the vehicle so as to correspond to the border 44 between the on area 40 and the off area 42 is formed at a position lower than a normal position 48 where the cutoff line 46 is supposed to be formed. In this case, the low beam light distribution can merely illuminate the vicinity of the vehicle and cannot illuminate a prescribed far position.

The middle column of FIG. 4 shows the state held in the middle of the restoration operation. As the actuator 30 operates, the optical unit 20 is driven, and the illumination direction of the optical unit 20 is moved back upward. During this period, the settings of the on area 40 and the off area 42 of the spatial light modulator 22 remain fixed. As a result, the cutoff line 46 moves closer to the normal position 48 (arrow 52) as the illumination direction of the optical unit 20 is restored (arrow 50).

The right column of FIG. 4 shows the state held at the completion of the restoration operation. As the illumination direction of the optical unit 20 is eventually switched to the first direction through the restoration operation, the cutoff line 46 moves back to the normal position 48, and thus the low beam light distribution becomes able to illuminate the prescribed far position.

Although this restoration operation takes only as slight as, for example, a few seconds, it still requires a certain amount of time for the actuator 30 to drive the optical unit 20. If the restoration operation does not complete before the vehicle starts moving, this may create a situation in which a far position that is supposed to be illuminated fails to be sufficiently illuminated for the period from when the vehicle starts moving to when the restoration operation completes.

Thus, as will be described below, in an embodiment, to improve the forward visibility, the settings of the area 40 and the off area 42 of the spatial light modulator 22 are adjusted during a restoration operation. During a restoration operation, the spatial light modulator 22 turns on at least part of the off area 42 of the spatial light modulator 22 for a normal light distribution pattern along with the on area 40 of the spatial light modulator 22 for the normal light distribution pattern.

Figure 5:
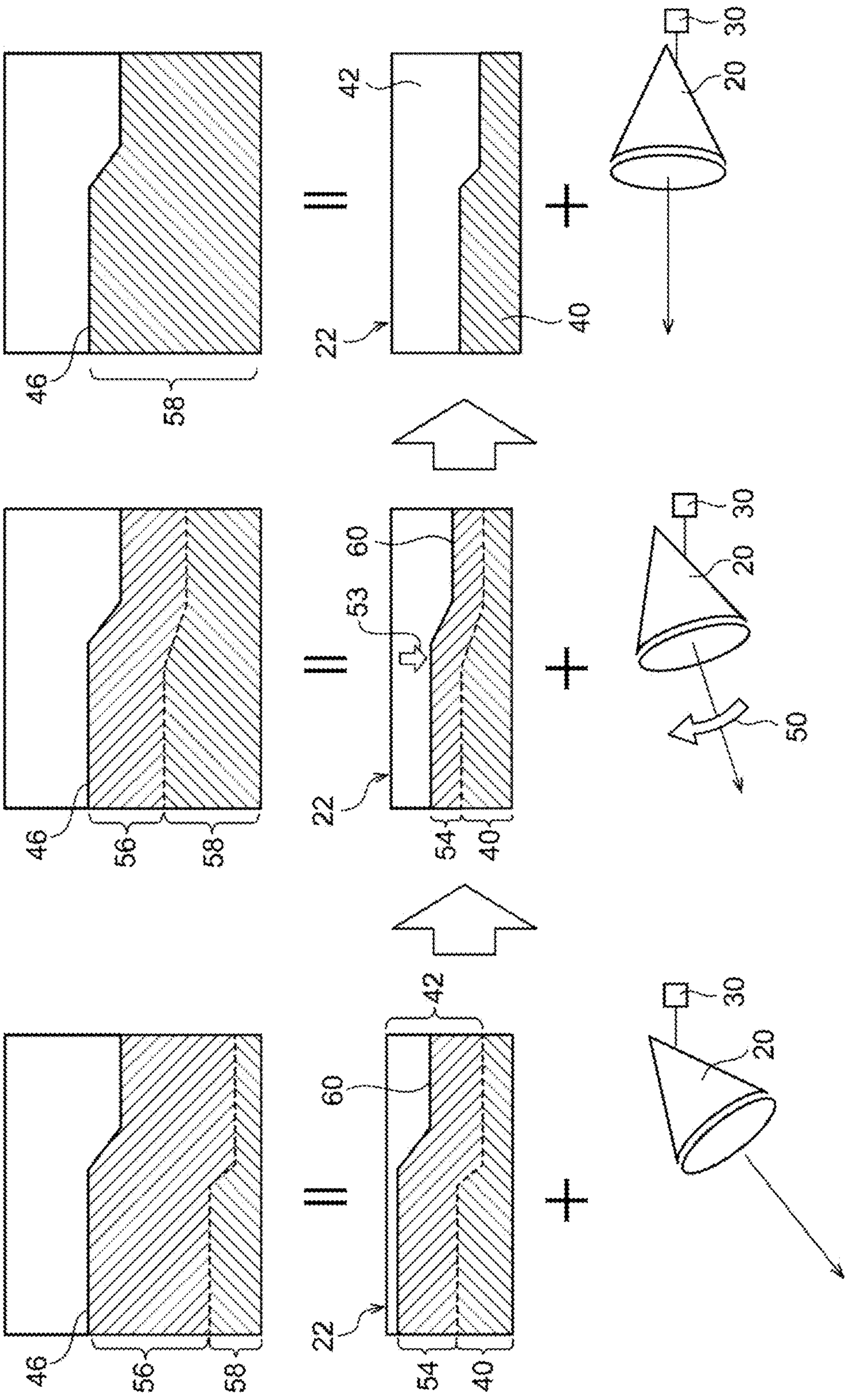
FIG. 5 is a schematic diagram showing a restoration operation of a vehicle lamp according to an embodiment.

FIG. 5 is a schematic diagram showing a restoration operation of a vehicle lamp according to the embodiment. In FIG. 5, as in FIG. 4, the top row shows an image of a light distribution ahead of the vehicle as viewed from the driver, the middle row shows an on area 40 and an off area 42 of the spatial light modulator 22, and the bottom row shows the illumination direction of the optical unit 20 schematically by the arrow.

The left column of FIG. 5 shows the state held at the start of the restoration operation. Unlike in the comparative example shown in FIG. 4, part of the off area 42 in the low beam light distribution serving as a normal light distribution pattern is used as an additional on area 54 during the restoration operation. Simultaneously as the road surface drawing is paused, this additional on area 54 as well as the original on area 40 is turned on in the spatial light modulator 22.

An additional illumination region 56 illuminated by the additional on area 54 is located above an illumination region 58 illuminated by the original on area 40. Since the original on area 40 and the additional on area 54 are adjacent to each other in the spatial light modulator 22, the original illumination region 58 and the additional illumination region 56 are seamlessly adjacent to each other to form a single bright region ahead of the vehicle.

The additional on area 54 is set in the spatial light modulator 22 such that the upper edge of the additional illumination region 56 forms the cutoff line 46 at the normal position. In other words, during the restoration operation, a border 60 between the additional on area 54 and the remaining portion of the off area 42 forms the normal cutoff line 46.

The middle column of FIG. 5 shows the state held in the middle of the restoration operation. As the actuator 30 operates, the optical unit 20 is driven, and the illumination direction of the optical unit 20 is moved back upward. During this period, the additional on area 54 is reduced in size in synchronization with the restoration operation (arrow 53). In other words, the border 60 is moved downward in the spatial light modulator 22 in synchronization with the movement of the optical unit 20. The border 60 may be moved smoothly or in stepwise. In this manner, although the illumination direction of the optical unit 20 changes during the restoration operation (arrow 50), the cutoff line 46 is retained at the normal position.

The right column of FIG. 5 shows the state held at the completion of the restoration operation. The illumination direction of the optical unit 20 is eventually switched to the first direction through the restoration operation. At this point, the additional on area 54 disappears, and the settings of the on area 40 and the off area 42 of the spatial light modulator 22 are restored.

Therefore, according to the embodiment, the cutoff line 46 can be formed at the normal position from the moment the restoration operation starts, and the low beam light distribution can illuminate the prescribed far position. Accordingly, unlike the comparative example, the embodiment makes it possible to ensure the forward visibility during a restoration operation.

The existing technique also proposes that, to deal with the insufficient forward visibility that may arise during a restoration operation described in relation to the comparative example, the duration of a single instance of road surface drawing be limited, for example, to a few seconds. Finishing a road surface drawing in a very short period of time can lower the likelihood that the vehicle starts moving in the middle of a road surface drawing.

In this respect, since the embodiment can improve the forward visibility during a restoration operation as described above, the embodiment renders it unnecessary to limit the duration of a road surface drawing. This makes it possible to design a road surface drawing that takes a longer time to finish.

Figure 6A:
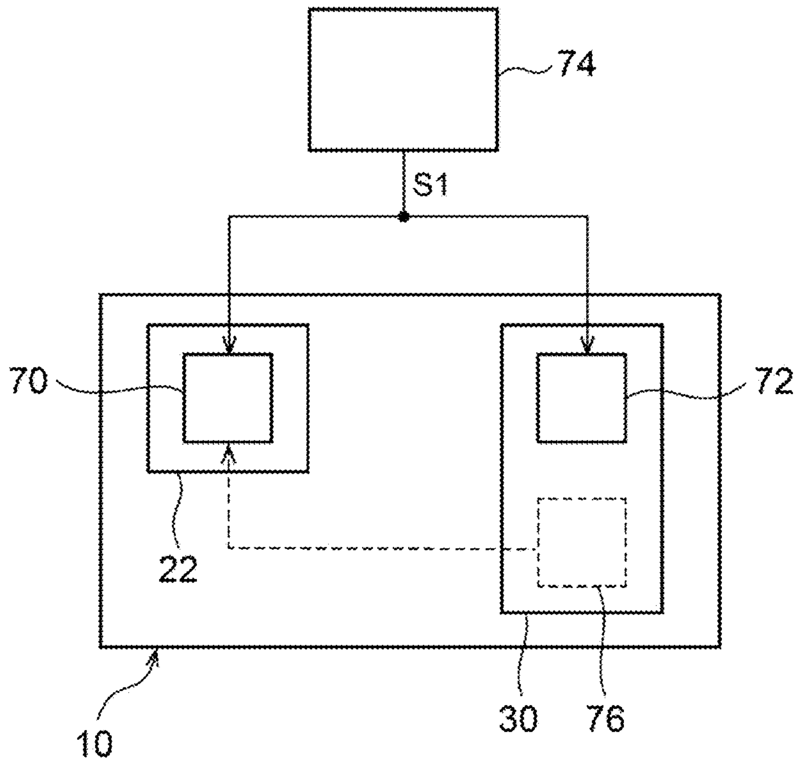
FIGS. 6A and 6B schematically show an illustrative configuration for providing a restoration operation according to an embodiment.
Figure 6B:
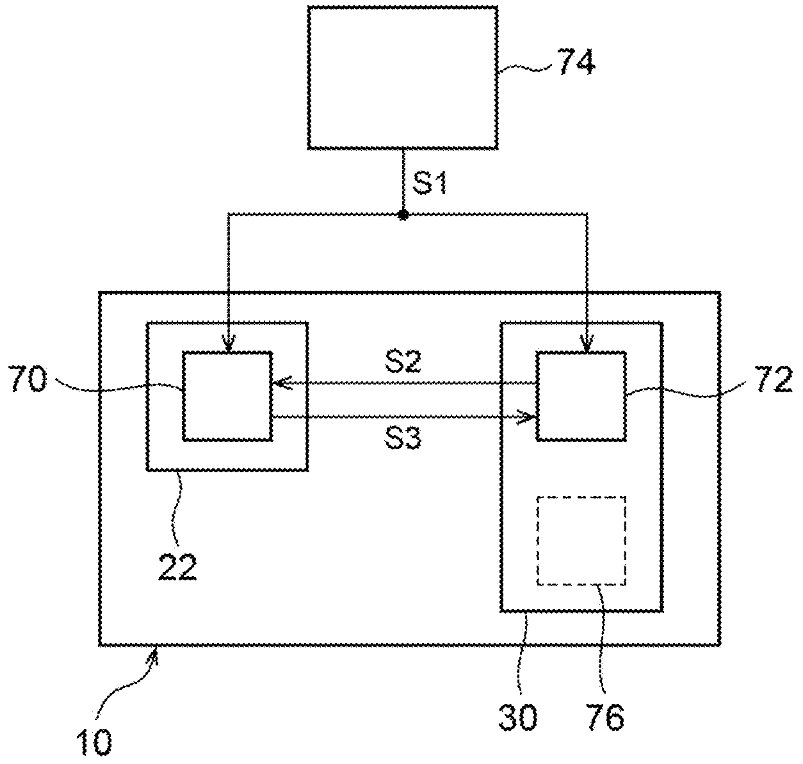

FIGS. 6A and 6B schematically show illustrative configurations for providing the restoration operation according to the embodiment. FIGS. 6A and 6B depict schematic configurations of a control system of the vehicle lamp 10 in the form of functional blocks. These functional blocks are implemented, in terms of their hardware configuration, by elements and/or circuits, such as a CPU and memory of a computer, or implemented, in terms of their software configuration, by a computer program or the like. It is to be appreciated by a person skilled in the art that these functional blocks can be implemented in a variety of forms through combinations of hardware and software.

As a first example, the spatial light modulator 22 and the actuator 30 may be configured to operate independently of each other during a restoration operation. As shown in FIG. 6A, the spatial light modulator 22 includes a first controller 70 that controls the spatial light modulator 22, and the actuator 30 may include a second controller 72 that controls the actuator 30.

A signal S1 that triggers a pause in a road surface drawing is provided to the first controller 70 and the second controller 72 from an onboard control device 74 (e.g., a vehicle electronic control unit (ECU) that integrally controls the entirety or part of the vehicle) provided outside the vehicle lamp 10. The signal S1 may be a signal that indicates, for example, emergence of the vehicle speed or the shift operation to the D range.

In response to receiving the signal S1, the first controller 70 pauses the road surface drawing and controls the settings of the on area and the off area of the spatial light modulator 22. At the same time, in response to receiving the signal S1, the second controller 72 controls the actuator 30 to restore the illumination direction of the optical unit 20 from the second direction to the first direction. The control of the spatial light modulator 22 by the first controller 70 and the control of the actuator 30 by the second controller 72 are preprogrammed in the first controller 70 and the second controller 72 such that they work in synchronization with each other to improve the forward visibility during a restoration operation, or preferably, such that the cutoff line is retained at the normal position during a restoration operation, as described with reference to FIG. 5.

A sensor 76 for detecting the operating state of the actuator 30 may be provided. The sensor 76 may be, for example, an angle sensor (e.g., a G sensor) that measures the attitude of the optical unit 20 driven by the actuator 30 or a distance sensor. When a camera capable of capturing an image of at least part of the optical unit 20 is provided in the vehicle lamp 10 as the sensor 76, the attitude of the optical unit 20 may be estimated from an image including the optical unit 20 captured by the camera. In response to receiving an output from the sensor 76, the first controller 70, based on the received output, may determine that the illumination direction of the optical unit 20 is restored to the first direction and end the restoration operation of the spatial light modulator 22 and the actuator 30.

As a modification, the first controller 70 may generate a signal S1 upon detecting an event that triggers a pause in a road surface drawing, control the spatial light modulator 22, and provide the signal S1 to the second controller 72. In response to receiving the signal S1, the second controller 72 may control the actuator 30. Conversely, the second controller 72 may generate a signal S1 upon detecting an event that triggers a pause in a road surface drawing, control the actuator 30, and provide the signal S1 to the first controller 70. In response to receiving the signal S1, the first controller 70 may control the spatial light modulator 22. In this manner, when the first controller 70 (or the second controller 72) generates a signal S1, a signal S1 from the onboard control device 74 is not essential for executing a restoration operation.

FIG. 6B shows a second example. In this example as well, as in the first example, a signal S1 that triggers a pause in a road surface drawing is provided from the onboard control device 74 to the first controller 70 and the second controller 72, and the spatial light modulator 22 and the actuator 30 start a restoration operation. Meanwhile, in response to receiving an output from the sensor 76, the onboard control device 74, based on the received output, may determine that the illumination direction of the optical unit 20 is restored to the first direction and end the restoration operation of the spatial light modulator 22 and the actuator 30.

As shown in FIG. 6B, the first controller 70 may control the spatial light modulator 22 and may also monitor whether the actuator 30 is operating normally. During the restoration operation, the first controller 70 may receive a state signal S2 from the actuator 30, and may continue controlling the spatial light modulator 22 if the state signal S2 indicates that the actuator 30 is operating normally or stop controlling the spatial light modulator 22 if the state signal S2 indicates that the actuator 30 has stopped anomalously.

In a similar manner, the second controller 72 may control the actuator 30 and may also monitor whether the spatial light modulator 22 is operating normally. During the restoration operation, the second controller 72 may receive a state signal S3 from the spatial light modulator 22, and may continue controlling the actuator 30 if the state signal S3 indicates that the second controller 72 is operating normally or stop controlling the actuator 30 if the state signal S3 indicates that the spatial light modulator 22 has stopped anomalously.

With this configuration, when either one of the spatial light modulator 22 and the actuator 30 stops operating for some anomaly in the middle of a restoration operation, the other also stops, which makes it possible to retain the cutoff line at the normal position.

As a modification, a control program for the spatial light modulator 22 and the actuator 30 for a restoration operation may be stored in the onboard control device 74. The onboard control device 74 may detect an event that triggers a pause in a road surface drawing and control the restoration operation of the spatial light modulator 22 and the actuator 30.

The onboard control device 74 may monitor whether the spatial light modulator 22 and the actuator 30 are operating normally. The onboard control device 74 may receive a state signal S2 from the spatial light modulator 22 and a state signal S3 from the actuator 30, and may continue with the restoration operation if the spatial light modulator 22 and the actuator 30 are operating normally or pause the restoration operation if at least one of the spatial light modulator 22 or the actuator 30 has stopped anomalously.

The present disclosure is not limited to the foregoing embodiments and modifications. The embodiments and the modifications can be combined, or further modifications, including various design changes, can be made to the foregoing embodiments and modifications based on the knowledge of a person skilled in the art. An embodiment or a modification obtained through such combining or making of further modifications is also encompassed by the scope of the present disclosure. The foregoing embodiments and modifications and a new embodiment obtained by combining the foregoing embodiments and modifications below have advantageous effects of each of the embodiments combined, the modifications, and the further modifications.

In the example described in the foregoing embodiment, a cutoff line 46 is formed during a restoration operation, but this is not essential. In one embodiment, a broader additional on area 54 may be formed without forming a cutoff line 46 during a restoration operation. For example, the entire on area 42 may be set as an additional on area 54. This configuration can further improve the forward visibility in an environment where a high beam is permitted, such as when no front vehicle is present.

In the example in the foregoing embodiment, restoration from a road surface drawing to a normal light distribution has been described, but the present disclosure may also be applied to restoration to a normal light distribution from other operations that involve adjusting or changing the illumination direction of the optical unit 20.

One example of such operations is the initializing operation of the actuator 30. While the illumination direction of the optical unit 20 is being moved for the initializing operation (i.e., when the illumination direction of the optical unit 20 is in the second direction different from the first direction for a normal light distribution), the initializing operation may be paused in response to a trigger caused by the movement of the vehicle, and a restoration operation according to the embodiment may be executed.

The present disclosure has been described based on the embodiments and with the use of specific terms, but the embodiments merely illustrate the principle and one aspect of the applications of the present disclosure, and a number of modifications and changes in the arrangement can be made to the embodiments within the scope that does not depart from the spirit of the present disclosure set forth in the claims.

What is claimed is:

1. A vehicle lamp, comprising:

an optical unit including a spatial light modulator that provides a normal light distribution pattern and a road surface drawing; and an actuator that drives the optical unit so as to switch an illumination direction of the optical unit between a first direction for the normal light distribution pattern and a second direction for the road surface drawing, the second direction pointing more downward than the first direction, the spatial light modulator being configured to turn on at least part of an off area of the spatial light modulator for the normal light distribution pattern along with an on area of the spatial light modulator for the normal light distribution pattern, during a restoration operation of the actuator that drives the optical unit so as to restore the illumination direction of the optical unit upward from the second direction to the first direction, the off area and the on area of the spatial light modulator for the normal light distribution pattern being defined as the areas which are respectively off and on when the optical unit is in the first direction and generates the normal light distribution, the spatial light modulator being configured to stop the road surface drawing and turn on the at least part of the off area along with the on area when the restoration operation of the actuator begins.

2. The vehicle lamp according to claim 1, wherein a region illuminated by the at least part of the off area turned on during the restoration operation is located above a region illuminated by the on area.

3. The vehicle lamp according to claim 2, wherein an upper edge of the region illuminated by the at least part of the off area turned on during the restoration operation forms a cutoff line of the normal light distribution pattern at least temporarily during the restoration operation.

4. The vehicle lamp according to claim 3, wherein the at least part of the off area turned on during the restoration operation is reduced in size in synchronization with the restoration operation such that the cutoff line is retained during the restoration operation.

5. A method of controlling a vehicle lamp, the vehicle lamp including an optical unit that includes a spatial light modulator and an actuator capable of adjusting an illumination direction of the optical unit, the method comprising:

operating the spatial light modulator so as to provide a normal light distribution pattern in a state in which the illumination direction of the optical unit is pointed in a first direction;

operating the spatial light modulator so as to provide a road surface drawing in a state in which the illumination direction of the optical unit is pointed in a second direction pointing more downward than the first direction; and turning on at least part of an off area of the spatial light modulator for the normal light distribution pattern along with an on area of the spatial light modulator for the normal light distribution pattern during a restoration operation of the actuator, the restoration operation restoring the illumination direction of the optical unit upward from the second direction to the first direction, the off area and the on area of the spatial light modulator for the normal light distribution pattern being defined as the areas which are respectively off and on when the optical unit is in the first direction and generates the normal light distribution, the method further comprising:

stopping the road surface drawing, together with the turning on the at least part of the off area along with the on area, when the restoration operation of the actuator begins.

6. A vehicle lamp, comprising:

an optical unit including a spatial light modulator that provides a normal light distribution pattern; and an actuator that drives the optical unit so as to switch an illumination direction of the optical unit between a first direction for the normal light distribution pattern and a second direction different from the first direction, the spatial light modulator being configured to turn on at least part of an off area of the spatial light modulator for the normal light distribution pattern along with an on area of the spatial light modulator for the normal light distribution pattern, during a restoration operation of the actuator that drives the optical unit so as to restore the illumination direction of the optical unit from the second direction to the first direction, the off area and the on area of the spatial light modulator for the normal light distribution pattern being defined as the areas which are respectively off and on when the optical unit is in the first direction and generates the normal light distribution, the spatial light modulator being configured to turn on the at least part of the off area along with the on area when the restoration operation of the actuator begins.

* * * * *